United States Patent
Ochoa

[19]

[11] Patent Number: 6,024,151
[45] Date of Patent: Feb. 15, 2000

[54] TIRE MOUNTING AND DEMOUNTING TOOL

[76] Inventor: Sandy Ochoa, 505 24[th]St., Alamogordo, N.Mex. 88310

[21] Appl. No.: 09/052,160

[22] Filed: Mar. 31, 1998

[51] Int. Cl.[7] .................................................. B60C 25/04
[52] U.S. Cl. ............................................. 157/1.3; 157/1.22
[58] Field of Search ..................................... 157/1.1, 1.17, 157/1.22, 1.3

[56] References Cited

U.S. PATENT DOCUMENTS

| | | | |
|---|---|---|---|
| 1,766,727 | 6/1930 | Steele | 157/1.22 |
| 3,104,695 | 9/1963 | McKinney | 157/1.22 |
| 3,247,883 | 4/1966 | Strang et al. | 157/1.22 |
| 3,584,672 | 6/1971 | Duquesne | 157/1.3 |
| 3,771,581 | 11/1973 | Johnson | 157/1.22 |
| 3,818,967 | 6/1974 | Dunn | 157/1.22 |
| 3,823,756 | 7/1974 | Rainey | 157/1.3 |
| 3,852,839 | 12/1974 | Blessing | 7/8 |
| 4,360,052 | 11/1982 | Norris | 157/1.3 |
| 4,436,134 | 3/1984 | Gaither | 157/1.3 |
| 4,527,607 | 7/1985 | Gaither | 157/1.3 |
| 5,343,921 | 9/1994 | Kusner | 157/1.3 |
| 5,367,732 | 11/1994 | Suggs, Sr. | 7/100 |
| 5,417,270 | 5/1995 | Brunner | 157/1.3 |

FOREIGN PATENT DOCUMENTS

| | | | |
|---|---|---|---|
| 1268203 | 6/1961 | France | 157/1.22 |
| 811073 | 4/1959 | United Kingdom | 157/1.22 |
| 90/12697 | 11/1990 | WIPO | 157/1.3 |

*Primary Examiner*—David A. Scherbel
*Assistant Examiner*—Joni B. Danganan
*Attorney, Agent, or Firm*—Dennis F. Armijo

[57] ABSTRACT

A tire iron for mounting and demounting tires from rims. The demounting head has a ball and neck for confining the tire bead and rim edge while the tire bead is peeled off. The mounting head also contains a ball and neck for similarly confining the tire bead. The mounting head is affixed to the tire iron so that it is substantially perpendicular to the plane of the rim while mounting a tire. The tool has flattened sides to maintain the direction of the mounting head while in use. Due to the unique ball and neck design, the tire tool has a working angle of 10° to 60° from the plane of the rim and can be used in a clockwise or counter clockwise direction.

6 Claims, 3 Drawing Sheets

TIRE MOUNTING AND DEMOUNTING TOOL

BACKGROUND OF THE INVENTION

1. Field of the Invention (Technical Field)

The present invention relates to tire irons. More particularly, the present invention is directed to a tire iron for use, but not by way of limitation, on small tires such as trailer tires, lawnmower tires, or the like.

2. Background Art

There are several tire irons in the market for mounting and demounting tires, however, most of these tools are made for larger tires. Use of these tools on smaller tires, such as trailer tires, wheelbarrow tires or all terrain vehicle (ATV) tires are too big and bulky and tend to damage the bead on the tires.

U.S. Pat. No. 5,417,270 to Brunner discloses a tire tool with a first lip for engaging the tire bead and a second lip for engaging the rim for mounting and a stripping lip for guiding the tool around the rim and a simple head to strip the tire bead. This tool creates friction between the tool and the tire/rim combination and tends to damage the tire bead when used.

U.S. Pat. Nos. 4,436,134 and 4,527,607 to Gaither are complex tools for removal of large tires such as truck tires, which cannot be manually manipulated for insertion of a standard tire tool. This tool involves the use of rollers to strip the tire from the rim and are unsuitable for small tires.

U.S. Pat. No. 5,343,921 to Kusner discloses a single piece forged tire iron with a integral knob element. The tire tool has mounting and demounting ends that are standards in the industry.

U.S. Pat. No. 3,823,756 to Rainey teaches the use of mounting head lips for the tire bead and rim similar to those in Brunner.

U.S. Pat. No. 3,771,581 to Johnson discloses another tire iron with a groove or lip for mounting and demounting tires.

None of the aforementioned prior art tire tools however, discloses the unique tire iron with a ball and neck mounting and demounting head for use at several different angles from the plane of the rim and a means to keep the mounting head substantially perpendicular to the plane of the rim.

SUMMARY OF THE INVENTION
(DISCLOSURE OF THE INVENTION)

In accordance with the present invention there is provided an apparatus and method for mounting and demounting tires from rims at variable working angles as chosen by the user. The demounting head comprises a ball and neck for locking a tire bead and rim at a working angle between 10° and 60° from the plane of the rim. The preferred demounting head further comprises a taper to prevent tearing of the bead during demounting.

The preferred mounting head comprises said mounting head affixed substantially perpendicular to a mounting arm. The mounting head comprises a ball and neck for locking a tire bead and rim and has a working angle between 10° and 60°. The preferred tire iron further comprises the mounting arm comprising flat sides for keeping the mounting head perpendicular to the plane of the rim. The preferred mounting head also comprises a taper for preventing tearing of the tire bead. The preferred tire iron further comprises an angled arm for applying direct torque to the mounting head.

A primary object of the present invention is to provide a tire tool for mounting and demounting small tires.

Another object of the invention is to provide a tire tool that operates in both a clockwise and counter clockwise direction.

Yet another object of the present invention is to provide a tire tool that minimizes friction when peeling on or off a tire from a rim.

A primary advantage of the present invention is that it can be used by right or left handed users.

Another advantage of the present invention is that it has a working angle for mounting and demounting tires in angles from 10° to 60° from the plane of the rim.

Yet another advantage of the present invention is that the ball and neck effectively confine the tire bead and rim in position.

Another advantage of the present invention is that the ball and neck configuration peels the tire on or off the rim.

Another advantage of the present invention is the flat mounting arm keeps the mounting head substantially perpendicular to the plane of the rim.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Best Modes for Carrying out the Invention

Figure 1:
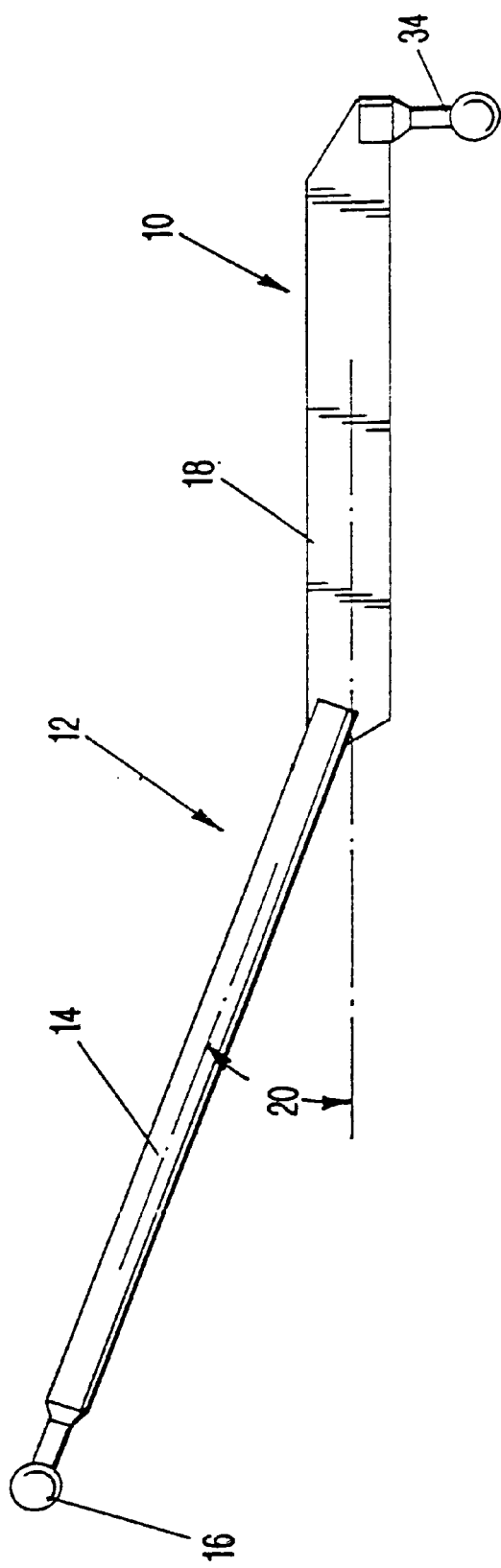
FIG. 1 is is a side view of the preferred tire tool.

The are a plethora of tire tools for mounting and demounting tires. The present invention is a unique tire tool which is effective when used on most tires but is especially effective on smaller tires such as trailer tires, lawn mower tires, wheel barrow tires and the like. FIG. 1 is a side view of the preferred tire iron 10. Tire iron 10 is preferably constructed from forged steel, or the like. Tire demounting end 12 comprises an angled arm 14 and demounting head 16. Angled arm 14 is preferably affixed to mounting arm 18 at an angle 20 of approximately 20°, from said mounting arm 18, as shown.

Figure 2:
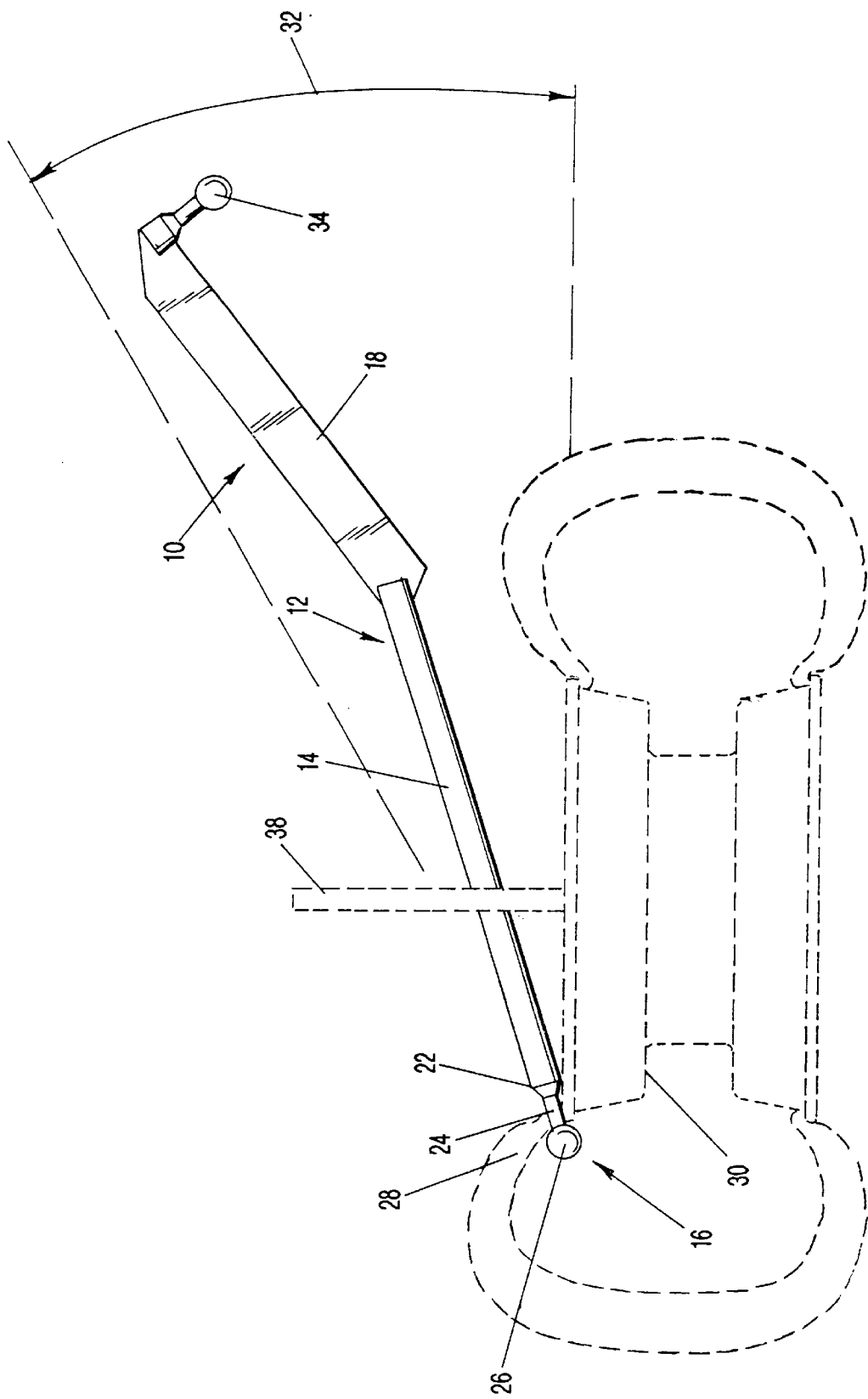
FIG. 2 shows the preferred demounting apparatus and method.

As shown in FIG. 2, the demounting head 16 is preferably an integral element of angled arm 14, but can also be threaded, welded or otherwise affixed to angled arm 14. The preferred demounting head 16 comprises demounting taper 22, demounting neck 24 and demounting ball 26. Demounting neck 24 is cylindrical in shape to relieve friction and to allow tire iron 10 to work around a rim in a circular motion as a tire is peeled off (not shown). Additionally, demounting neck 24 is long enough to allow tire bead 28 and rim 30 to lock onto the combination of demounting ball 26, demounting taper 22 and demounting neck 24, as shown. As previously described, the combination of demounting ball 26 and demounting neck 24 are of sufficient diameter to wedge or lock onto tire bead 28 and rim 30, so that when the tire iron 10 is worked around rim 30, tire bead 28 is peeled off. Demounting taper 22 prevents the tire bead 28 from tearing or pinching during the demounting procedure. This unique design allows for demounting tires in a clockwise direction or counter-clockwise direction. Tire iron 10 is designed to operate from 10° to a 60° working angle 32 from the plane of rim 30.

To demount a tire, the air in the tire is let out and the tire placed on a machine with a fulcrum 38. Demounting head 16 is placed between tire bead 28 and rim 30, so that tire bead 28 and rim 30 are in contact with demounting neck 24 and are constrained between demounting ball 26 and demounting taper 22. Tire iron 10 is then moved to the preferred working angle 32, pushed or pulled on mounting arm 18, in a circular motion, in a clockwise or counter clockwise direction, pressing angled arm 14 against fulcrum 38, causing tire bead 28 to be peeled from rim 30.

Figure 3:
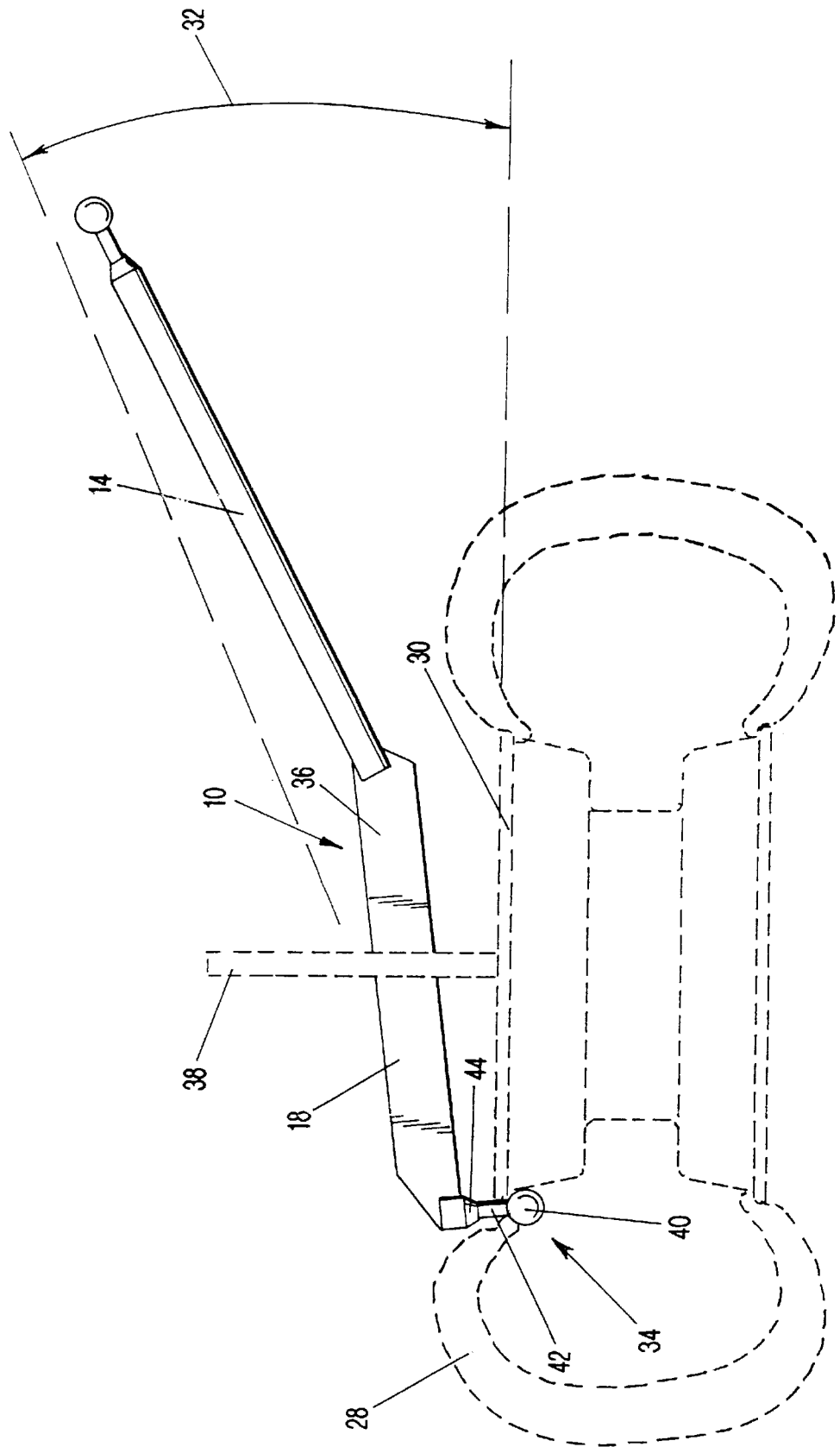
FIG. 3 shows the preferred mounting apparatus and method.

FIGS. 1 and 3 show the preferred mounting apparatus and method. Mounting head 34 is affixed to mounting arm 18, substantially perpendicular to said mounting arm 18, as shown. Similar to demounting head 16, mounting head 34, can be threaded, welded or affixed to mounting arm 18, using methods well known in the art. Mounting arm 18 has flat sides 36 (only one side shown, the other side is a mirror image) to keep mounting arm 18 substantially perpendicular to the plane of rim 30 when tire iron 10 is levered in a clockwise or counter clockwise direction against fulcrum 38, which is contained on most tire machines. Mounting head 34 is similar to demounting head 16, comprising mounting ball 40, mounting neck 42, and mounting taper 44. The diameter of mounting ball 40 is similar to the diameter of demounting ball 26. The length of mounting neck 42 is similar to demounting neck 24, and is dependent on the size of tires to be mounted or demounted. Mounting neck 42 is also cylindrical in shape. As previously discussed, the diameter of mounting ball 40, and length and diameter of mounting neck 42, are sized to effectively lock tire bead 28 and rim 30 onto mounting head 34, and force tire bead 28 onto rim 30, as mounting head 34 is rotated around rim 30. Similarly, mounting taper 44 prevents tire bead 28 from tearing or pinching during the mounting procedure. The purpose of angled arm 14 is to provide substantially direct torque to mounting head 34. With the combination mounting ball 40 and mounting neck 42, a user can operate the tire iron at any angle from 10° up to 60° from the plane of the rim 30.

To mount a tire using tire iron 10, rim 30 is placed on a tire machine (not shown). The tire is then placed on top of rim 30. Mounting head 34 is placed between tire bead 28 and rim 30, and angled arm 14 is raised to working angle 32, which is any angle between 10° and 60°. Angled arm 14 is then pushed or pulled in a circular motion, either in a clockwise or counter clockwise direction, pressing flat side 36 against fulcrum 38. As mounting head 34 is moved around rim 30, tire bead 28 is peeled onto rim 30, as shown.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, and of the corresponding application(s), are hereby incorporated by reference.

What is claimed is:

1. A tire iron for mounting a small tire onto a rim and demounting a small tire from the rim, said tire iron comprising:

a demounting head comprising a demounting ball and demounting neck for locking a tire bead of the small tire and the rim onto said demounting head when said demounting head is placed between the tire bead and the rim; and a mounting head comprising a mounting ball and mounting neck affixed substantially perpendicular to a mounting arm for locking the tire bead of the small tire and the rim onto said mounting head when said mounting head is placed between the tire bead and the rim.

2. The invention of claim 1 wherein said demounting head further comprises a demounting taper between said demounting neck and an angled arm.

3. The invention of claim 2 wherein said angled arm is affixed to said mounting arm at an angle for providing substantially direct torque to said mounting head when mounting the small tire onto the rim.

4. The invention of claim 1 wherein said mounting head further comprises a mounting taper between said mounting neck and said mounting arm.

5. The invention of claim 1 wherein said mounting arm comprises flat sides for maintaining said mounting head substantially perpendicular to a plane of the rim when mounting the small tire onto the rim.

6. A mounting head on a tire iron for mounting a small tire onto a rim, said mounting head comprising:

a ball;

a cylindrical neck comprising a first end affixed to said ball;

a taper affixed to a second end of said cylindrical neck; and a means of affixing said mounting head substantially perpendicular to a plane of the tire iron, wherein said ball and cylindrical neck is placed between a tire bead and the rim.

* * * * *